United States Patent
Whitten et al.

(10) Patent No.: US 7,346,635 B2
(45) Date of Patent: Mar. 18, 2008

(54) SYSTEM AND METHOD FOR TRANSFERRING A DATABASE FROM ONE LOCATION TO ANOTHER OVER A NETWORK

(75) Inventors: Gary Whitten, Washington, DC (US); Vien V. Nguyen, Gaithersburg, MD (US)

(73) Assignee: Connection Concepts, Inc., Silver Spring, MD (US)

( * ) Notice: Subject to any disclaimer, the term of this patent is extended or adjusted under 35 U.S.C. 154(b) by 245 days.

(21) Appl. No.: 10/761,732

(22) Filed: Jan. 21, 2004

(65) Prior Publication Data

US 2004/0153459 A1    Aug. 5, 2004

Related U.S. Application Data

(60) Provisional application No. 60/441,604, filed on Jan. 21, 2003.

(51) Int. Cl.
*G06F 12/00* (2006.01)
*G06F 17/30* (2006.01)

(52) U.S. Cl. .............. 707/204; 707/100; 707/102; 707/200; 709/219; 709/201

(58) Field of Classification Search ........ 707/200–204, 707/10, 1, 3, 100–102; 709/219, 201
See application file for complete search history.

(56) References Cited

U.S. PATENT DOCUMENTS

| | | | |
|---|---|---|---|
| 6,252,956 B1 * | 6/2001 | Karino | 379/279 |
| 6,604,110 B1 * | 8/2003 | Savage et al. | 707/102 |
| 7,065,541 B2 * | 6/2006 | Gupta et al. | 707/204 |
| 2003/0037029 A1 * | 2/2003 | Holenstein et al. | 707/1 |
| 2003/0177146 A1 * | 9/2003 | Zimowski | 707/200 |
| 2003/0195987 A1 * | 10/2003 | Krishnamurthy et al. | 709/246 |
| 2006/0277227 A1 * | 12/2006 | Britton et al. | 707/201 |

* cited by examiner

*Primary Examiner*—John Cottingham
*Assistant Examiner*—Susan F Rayyan
(74) *Attorney, Agent, or Firm*—McCormick, Paulding & Huber LLP (57) ABSTRACT

A client-server system for transferring a database from a server to a client across database types, vendors and without development effort. The system providing a server having access to a source database to be transferred to a client. The source database having metadata associated therewith including information regarding the structure and fields of the source database. The system including a client which communicates with the server through a network. The client having a data access application for processing the data received from the server and generating and populating a copy of the source database for use by the client.

32 Claims, 5 Drawing Sheets

Applet Based *DataPortal* Client Session - Web Browser User Interface

FIG. 8

SYSTEM AND METHOD FOR TRANSFERRING A DATABASE FROM ONE LOCATION TO ANOTHER OVER A NETWORK

CROSS REFERENCE TO RELATED APPLICATIONS

This application claims priority to a prior U.S. provisional application Ser. No. 60/441,604 filed on Jan. 21, 2003 entitled "System and Method for Transferring Database from One Location to Another", which is incorporated herein by reference.

FIELD OF THE INVENTION

The present invention relates generally to the transferring of databases from one location to another over a network. In particular, the present invention relates to a client-server system for transferring an entire database including both the structure and content of the database from a server to a client over the Web or general TCP/IP networks, without development effort and across database types, vendors and operating systems.

BACKGROUND OF THE INVENTION

A feature of the Internet or World Wide Web, (WWW or Web) is the ability to transmit electronic data files from one computer to another using various types of file transfer protocols such as File Transfer Protocol (FTP) and Hypertext Transfer Protocol (HTTP). Accordingly, the Web has fundamentally changed the way people use data by making vast numbers of documents readily available with little effort. The impact on productivity has been dramatic.

A comparable, and perhaps more significant impact could be realized by enabling a similarly effortless exchange of business data. While many business systems perform well on their own, they tend to be isolated, so that the promise of end-to-end automation has not yet been realized. Ideally, all systems involved in a business process should be able to easily work together to perform a complete transaction. For example, an ordering system which may include sub-systems for inventory, shipping, billing, and receiving should be compatible for processing a complete sales transaction. In such a system, all relevant sub-systems could perform a complete end-to-end business process without human assistance, resulting in dramatic productivity gains and significant shifts in the way business systems operate.

A barrier to improving the integration and automation in business systems is the lack of a simple and standard way to share business data. Web documents are well suited for use by individuals, but they are not naturally or efficiently processed by business systems. It would be far more effective to transfer business data, in its most natural form, (i.e., databases) directly into the business systems that use the data.

To achieve this goal using existing technology, business systems must conform to demanding and cumbersome Electronic Data Interchange (EDI) requirements, or programmers must develop transfer schemes on a case-by-case basis. There is no current standard for transferring business data stored in databases from one location to another over a network without some development effort and/or prior knowledge of the data to be transferred. Therefore, business processing has yet to experience a revolution in productivity comparable to that resulting from the introduction and adoption of the document-centric Web in place today.

SUMMARY OF THE INVENTION

It is the general object of the present invention to provide a system and method for transferring an entire database from one location to another over a network without development effort, that improves upon, or overcomes the problems and drawbacks associated with prior art data transfer systems.

The present invention offers advantages and alternatives over the prior art by providing a client-server system for transferring an entire database from one location to another over a network. The present invention database transfer system allows a client to copy a complete database, without development effort, including both the structure and contents of the database regardless of the configuration of the database, database type, vendor or operating platforms. The result is the creation of a copy of a source database at a destination identified by the client so that business data may be shared among business systems over the Web without a development effort in much the same way as documents are currently exchanged over the Web.

The present invention database transfer system in an exemplary embodiment provides a client-server system having a server computer or server connectable to a network and a client or client computer connectable to the network for communication with the server. A source database accessible to the server is provided for transfer to a client. The source database having data stored therein and metadata associated therewith identifying the structure and at least one field of the source database. The client having a memory accessible thereto for storing a copy of the source database.

The server includes an executable program for accessing the source database and retrieving the metadata and at least a portion of the data stored therein. The server providing for generating and executing queries to the source database for retrieving the metadata and the stored data therefrom and storing the retrieved data in at least one data object. The server then transfers the at least one data object to the client. The client receives the at least one data object from the server, extracts the metadata and uses it to generate a database with the appropriate structure and tables and populates each table of the copy of the database with the data from the corresponding data object.

In an alternative exemplary embodiment, for use with the transfer of large databases, the database transfer system of the present invention provides a segmentation process for ensuring a database object transmitted to a client does not exceed a predetermined maximum size determined by the maximum size of objects that can be serialized and sent over a network. Prior to transmitting a database object to a client over a network the segmentation process determines whether the database object exceeds a predetermined maximum object size. If the size of the database object is greater than the maximum, the process truncates the database object prior to transmission thereof to the client and stores the truncated data in an auxiliary database object for subsequent forwarding to the client. The truncation can occur at any point in the database, including the interior of a cell.

The present invention database transfer system provides a standardized system and method for the transfer of business data, namely databases, from one location to another over the Web or any TCP/IP network. Presently, there is not a formal standard for storing and processing business data without a development effort. However, a very large number of business systems store business data in some type of Relational Data Base Management System (RDBMS). Database data can naturally serve as a common language (lingua franca) for most business systems currently in use, thus, the present invention database transfer system can serve as a common means of business data exchange over the Web without need of development effort.

Many RDMBS systems in use today come from different vendors and employ different operating systems and interfaces. The present invention database transfer system uses existing standards to provide a common framework for accessing database data from all major RDBMS systems and computer platforms. The system accesses and identifies the complete structure of a source database and retrieves its contents and converts the structure data and the contents of the database into a serial stream that it sends over a network using the standard Transmission Control Protocol/Internet Protocol (TCP/IP).

The serial data is received by an authorized client, which creates a new database with the appropriate structure and populates it with data from the stream. The result is the creation of a copy of the source database at a destination RDBMS chosen by the client. The database transfer can be performed over the Web or any TCP/IP network and can be achieved by the client without development effort or even explicit software installation beyond commonly installed standard software (e.g. Java-enabled Web browsers).

Additionally, the database transfer system provides for the incremental transfer of data between the server and client to maintain synchronization of a transferred database at the client with a source database.

In another aspect, the client-server system of the present invention provides a Web based database utility for client viewing and modifying database data across database types, vendors and platforms without requiring the transfer of the entire database to the client.

DETAILED DESCRIPTION

Figure 1:
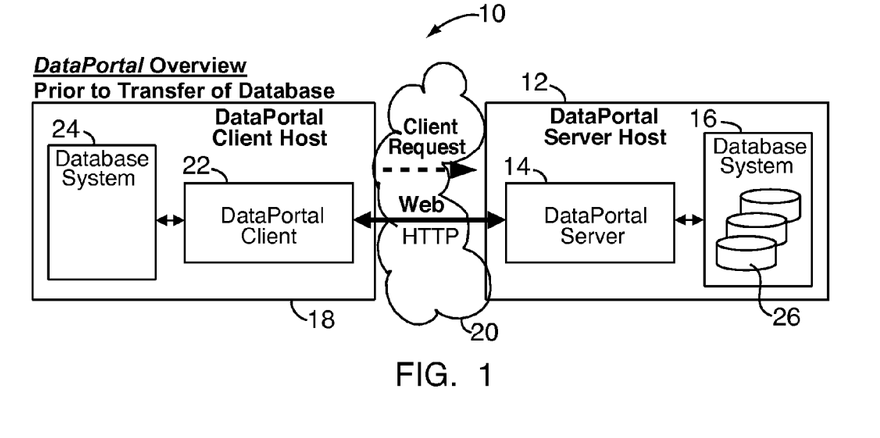
FIG. 1 is an exemplary embodiment of a schematic block diagram of a client-server system in accordance with the present invention shown at the initiation of the transfer of a database from a server to a client.
Figure 2:
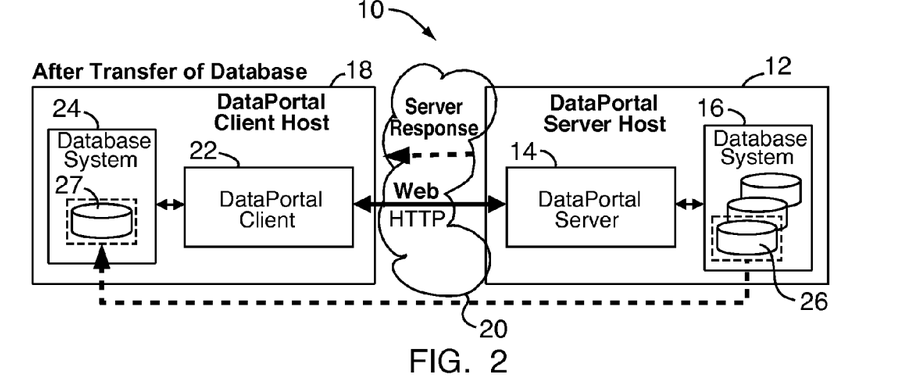
FIG. 2 is a schematic block diagram of the client-server system of FIG. 1 shown after the transfer of a database from a server to a client.

Referring to FIGS. 1 and 2, an exemplary embodiment of a schematic block diagram of a client-server system in accordance with the present invention is shown generally at 10. The client-server system 10 includes a server system 12 having a DataPortal server or server 14, and a server database system 16. The client-server system 10 includes a client system 18 which communicates with the server system 12 through a network 20. The client system 18 includes a client server (or client) 22 and a client database system 24. FIG. 1 illustrates the client-server system 10 prior to the transfer of a source database 26 from the server system 12 to the client system 18. FIG. 2 shows the client-server system 10 following the transfer of the source database 26 to the client system 18. The database 27 shown in FIG. 2 is a copy of the source database 26 generated and stored on the client system 18 in accordance with the present invention database transfer system.

Figure 3:
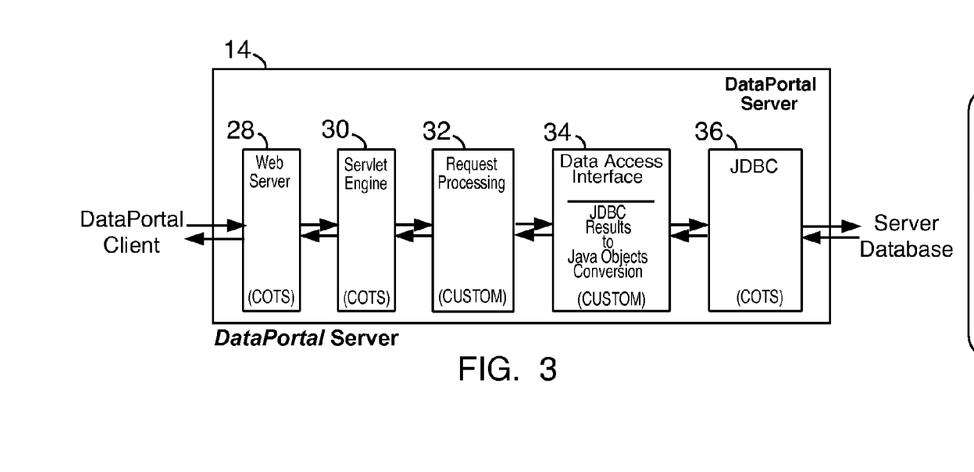
FIG. 3 is a schematic block diagram of a server in accordance with the present invention.

FIG. 3 is a block diagram of one embodiment of a server 14 according to the present invention. The server 14 includes a "commercial off the shelf" (COTS) Web server 28 for communicating with the client 22 over standard Web channels via a Web protocol such as Hypertext Transfer Protocol (HTTP). Additionally, the server 14 includes a servlet engine 30. In the illustrated embodiment the servlet engine 30 is a Java servlet engine for processing Java applications. The server 14 also includes a request processing application 32 for processing client requests. Also provided is a data access application 34 for accessing a server accessible database system 16 and processing data retrieved from a source database 26 for transfer to the client 22. In the FIG. 3 embodiment, the server 14 includes a Java DataBase Connectivity (JCBC) programming interface 36 coupled to the data access application 34 for accessing the database system 16 via the Structured Query Language (SQL) standard. The request processing application 32 and the data access application in this exemplary embodiment are written in the Java programming language. Alternate programming interfaces can be provided for use by the server 14 to interface a particular database server 16 or database 26 depending on the type of database or data stored therein.

Figure 4:
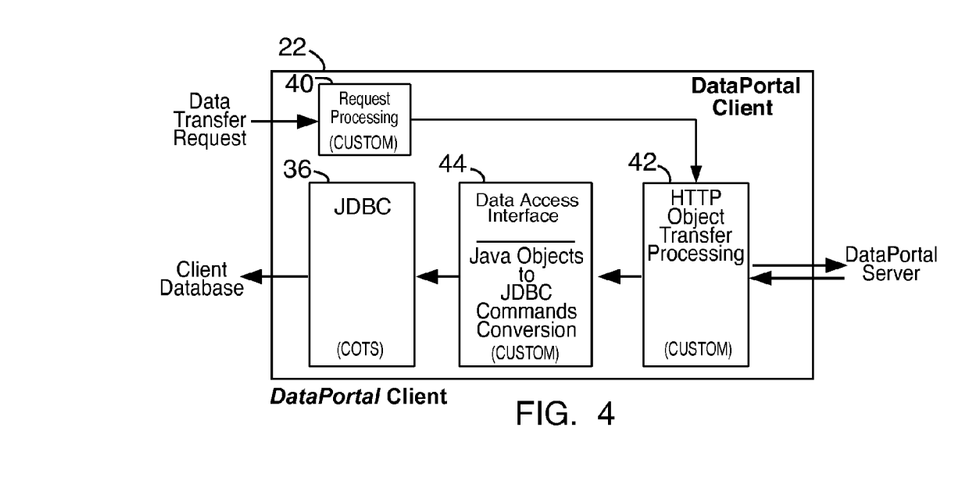
FIG. 4 is a schematic block diagram of a client in accordance with the present invention.
Figure 8:
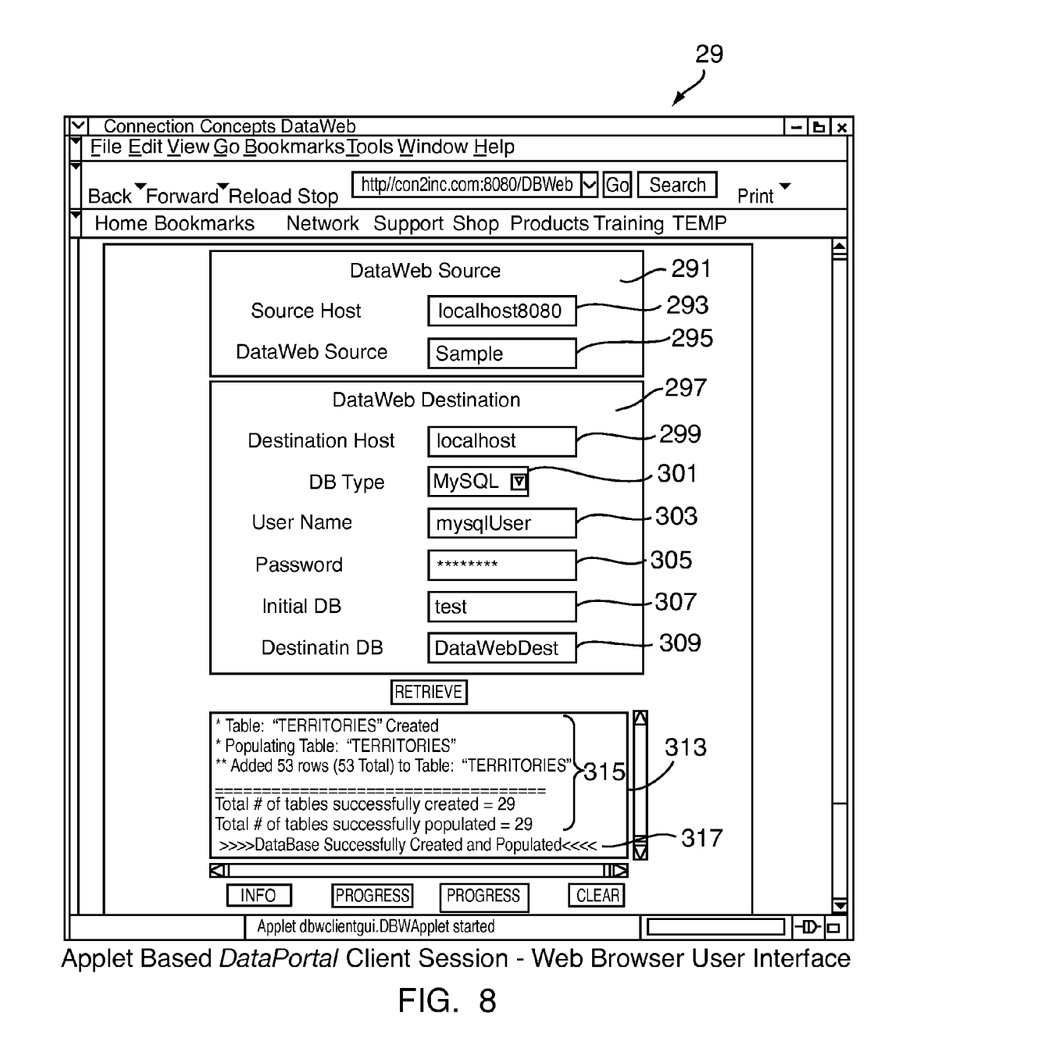
FIG. 8 is an exemplary embodiment of a web browser user interface in accordance with the present invention.

FIG. 4 is a block diagram of one embodiment of a client 22 according to the present invention. As shown, the client 22 includes a request processing application 40 for receiving and processing data requests from a user being a human operator or program (not shown). The transfer of a source database 26 from the server 14 to the client 22 can be initiated from a user request via a GUI (Graphical User Interface) application or programmatically via an HTTP request directed to the client or using a DataPortal API module embedded in a custom user system. FIG. 8 shows one embodiment of a web browser user interface 29 for use initiating the transfer of a source database to the client 22. Alternatively, as mentioned above, the client-server system 10 provides a functionality to allow a database transfer to be initiated programmatically rather than interacting from a GUI.

In a preferred embodiment, the client software including the user interface 29 is automatically downloaded over the Web and installed into the client's Web browser in the form of a lava applet so a user is not required to manually install any software to perform the database transfer. As shown in the FIG. 8 embodiment, a user is only required to identify a source database, specify a destination for the copy database and initiate the transfer via a mouse click on a selector. The user needs no information regarding the source database beyond the name of the source database. No additional information or user actions are required from the user throughout the transfer process.

Referrin a am to FIG. 8, the graphical user interface 29 includes an area 291 labeled "DataWeb Source" wherein a user can fill in or select information regarding the source database 26 at the client 22. Inside the DataWeb Source box 291 a text box 293 is displayed labeled "Source Host" wherein a user can fill in or select the name or Internet Protocol (IP) address of the source host. Preferably, an IP address or name for the source host is already filled in or selected, so the user does not have to manually fill in or specify an IP address or name of the source host.

Also displayed in the DataWeb Source box 291 is a source database text box or pull-down menu 295 also labeled "DataWeb Source" wherein a user can specify the source database 26. In a one embodiment, the source database 26 is identifiable via a pull-down menu displaying a name or identifier for all of the source databases available on the server 14. Alternatively, the name of the source database can be manually entered by a user at the text box 295.

Additionally, the user interface 29 includes a box 297 labeled "DataWeb Destination" wherein a user can input or select information regarding the database 27 which is the copy of the source database 26 to be generated and stored at a desired destination accessible to the client 22. To specify a destination for the database 27, a user fills in the "Destination Host" text box 299 with the name or IP address of the copy database host. Thereafter, a pull-down menu 301 labeled "DB Type" is displayed which includes a selectable list of a plurality of common database types from which the user selects the type/vendor (e.g. MySOL, Oracle, DB2 . . . ) of the destination or copy database 27. One key feature of the present invention client-server system 10 is that the destination database 27 need not be of the same type or provided by the same vendor as that of the source database 26. Further, the client 22 may utilize a different operating system than that of the server 14.

At text boxes 303 and 305, labeled "User Name" and "Password", the user fills in his/her user name and password, respectively which are typically required for initiating a database transfer and/or for confirming authorization to access the source database.

Still referring to FIG. 8, the user interface includes a text box 307 labeled "Initial DB" wherein the user inputs the name of an initial database for use with certain database servers which may require an initial database to exist for establishing a connection for the transfer process. Further, the user interface 29 displays a text box 309 labeled "Destination DB" wherein a user can input the name of the destination database or copy database 27. No other information regarding the destination database 27 is required from the user to complete the transfer process.

Once the user completes the form of the user interface 29, the transfer process is initiated via user selection of the box 311 labeled "RETRIEVE". Once the user selects the RETRIEVE box via a mouse click thereon to execute the database transfer, the server 14 and client 22 cooperate to carry out the transfer process automatically and no further user interaction is required. Accordingly, the user can effect the transfer of the source database to a desired destination by merely identifying the source database and the type thereof and a destination location for the target database. No other information is required from the user. Further, as set forth above, the user is not required to input technical information as to the source or target database nor provide any information other than basic information sufficient to identify the desired database to be transferred and the location and type of the desired copy of the source database.

Still referring to FIG. 8, once a database transfer operation is initiated as set forth above, an Info/Progress data box 313 is updated in real time to reflect the progress of the database transfer process. For example. in the illustrated embodiment, the Info/Progress box 313 includes information lines 315 regarding a table identified as "TERRITORIES" and the status as to the number of rows created and populated for the table. Additionally, a status line 317 includes the statement "DataBase successfully Created and Populated" for communicating to the user that the requested transfer operation has been successfully completed. A user selectable "INFO" button 319 causes the display of information regarding the transfer process including the source database 26 and destination database 27 in the Info/Progress data box 313. Similarly, a user selectable "PROGRESS" button 321 causes a display in the Info/Progress data box 313 information regarding the status of a current transfer process in real time. A selectable "CLEAR" button 323 is also provided to clear which causes the Info/Progress data box 313 to clear upon selection thereof.

The client 22 includes an object transfer application 42 for sending and receiving data to and from the server 14 via the network 20 using the HTTP protocol. The client also includes a data access interface 44 and a JDBC programming interface 36. The data access interface 44 processes data received from the server 14 and using the JDBC interface 36 recreates a database 24 corresponding to the structure of the source database 26 and populates the database 27 with data received from the server 14 resulting in the database 27 being a copy of the source database 26 for use by the client 22.

The data access interface 44 may include a mapping configuration file for providing data type mapping configurations for use as necessary to support the configuration and mapping of the various data types utilize by database vendors. The JDBC programming interface 36 utilized by the client 22 to access the client database system 24 is the same as that described above with respect to the server system 12. Alternate programming interfaces can be provided for use by the client to interface a particular database server or database depending on the type of database or data stored therein. The client applications for use in the database transfer can be downloaded from the server 14 upon a prompt from the server following a client request for a database transfer from the server. Additionally, the client application can be configured as a browser plug-in and set to operate automatically when a database transfer is requested.

Figure 5:
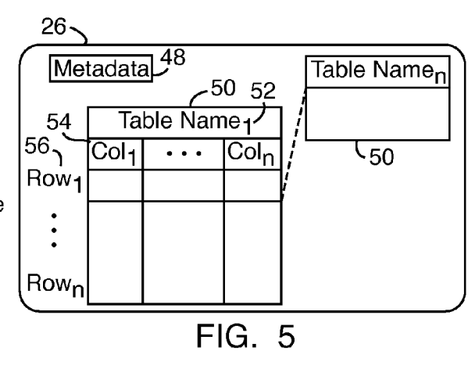
FIG. 5 is an exemplary embodiment of a schematic block diagram of a database in accordance with the present invention.

FIG. 5 is a block diagram of one embodiment of a source database 26 according to the present invention. The source database 26 includes metadata 48 associated with the source database that contains information describing the structure and contents of the source database including schema and catalog information for the source database. The metadata 48 also includes a list of tables 50 of the source database 26 including the table name 52, table references, and indexing for performance improvement. Additionally, the metadata 48 includes information related to each of the tables 50 including, for each table, a list of columns 54 in the table and the data type stored in each column. The metadata 48 can also include information pertaining to the rows 56 for each of the tables 50.

Figure 5A:
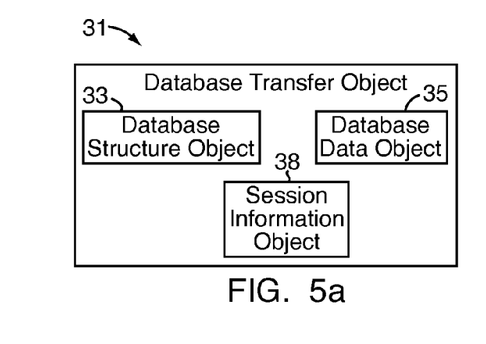
FIG. 5a is a schematic block diagram of a data transfer object in accordance with the present invention.

FIG. 5a illustrates the basic objects used by the server 14 to send data to the client 22. Database transfer object 31 is a high level object that contains all other objects sent to the client 22 including a database structure object 33 that contains database and table structure information extracted from the metadata 48 for the source database 26. The database data object 35 contains actual table 50 data used for populating database tables. The session information object 38 is used to identify session information between the server 14 and client 22 so that interrupted transfer sessions can retrieved and continued.

Figure 6:
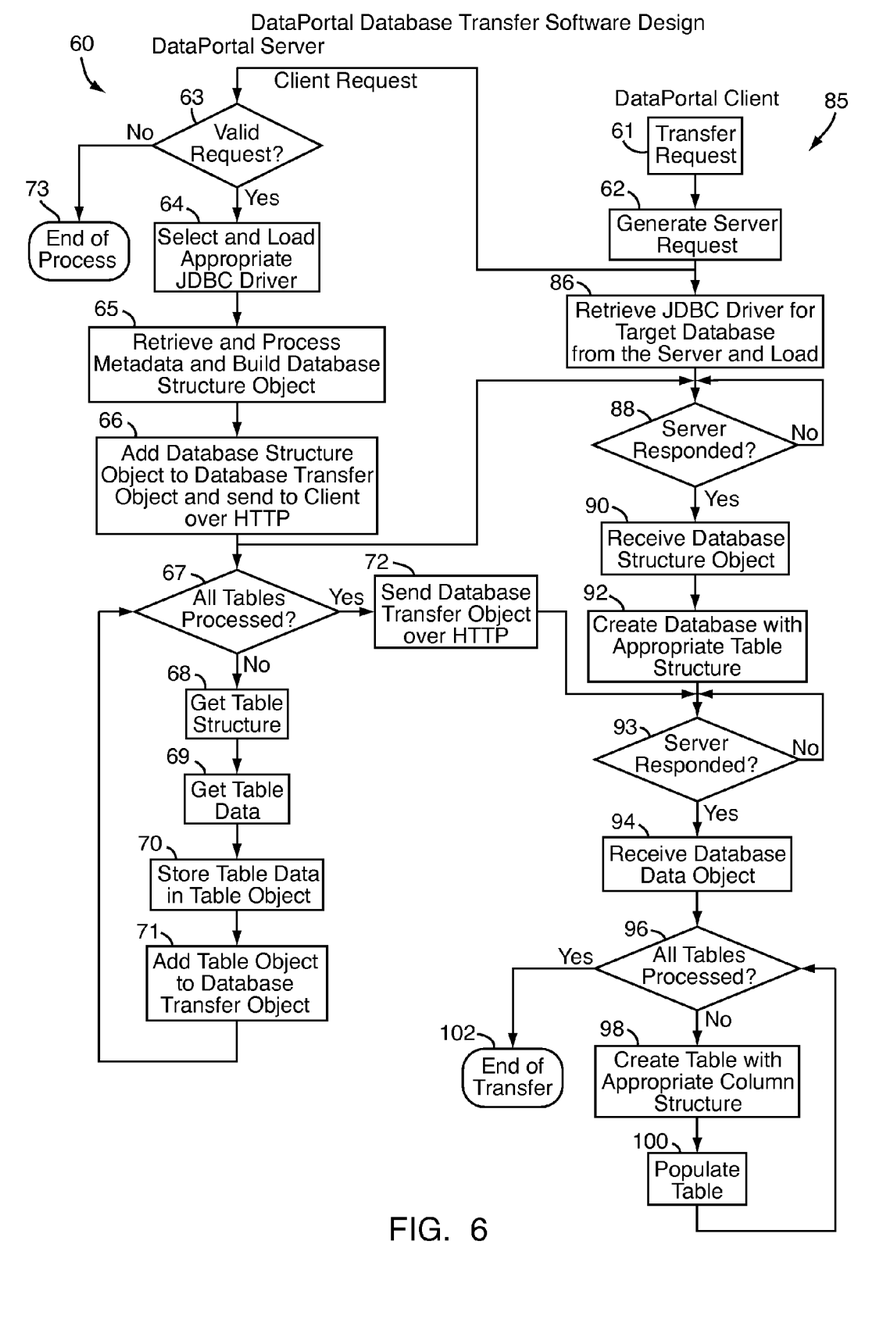
FIG. 6 is a flow chart of an exemplary overview of the database transfer process of the present invention.

Referring to FIG. 6, the operation of the server 14 is illustrated generally at 60 and the operation of the client 22 shown generally at 85. When a user at the client 22 (either a human operator or a program) requests a database transfer at step 61, the client generates a request to the server 14 at step 62 in the form of an HTTP request based on the source database 26 indicated by the requesting agent. The server 14 receives the client request at step 63 wherein the request is validated to determine whether processing should continue. The client request can be in the form of a specified location of a source database 26 available for transfer to the client 22, e.g., a Uniform Resource Locator (URL). At the server 14, the web server 28 receives the client request and forwards the request to the request processing application 32.

The request processing application 32 processes the request including providing security screening for authorizing client access to the requested source database 26. The security screening may include numerous types of screening processes such as client authorization and or content specific authorization. Content specific authorization can provide certain users access to only specified subsets of a database 26 as opposed to an entire database. For example, in an employee database, a field containing employee salaries may be accessible to only certain managers wherein other users of the employee database may access other fields of the database.

Upon successful validation of a client request the request processing application 32 forwards the client request to the data access application 34 for performing the requested transfer. If the request is determined not valid, the process ends at block 73.

Upon receipt of a validated client request, the server data access interface 34 determines the required JDBC driver and loads it and generates queries for retrieving the metadata 48 from the source database 26 as illustrated at steps 64 and 65 of the flow chart. The queries are transferred to the JDBC programming interface 36 for execution on the source database 26. Depending on the type of the source database 26 an appropriate JDBC interface 36 is selected and used to access the source database 26. Accordingly, the request processing application 32 is universal and need not be modified for use with numerous types of databases 26. In the preferred embodiment, the client-server system 10 is compatible with most Relational Data Base Management Systems (RDBMS) wherein the system of the present invention operates without further development or prior knowledge of a source database 26 or data types stored therein.

Once the metadata 48 is retrieved from the source database 26, the request processing application 32 generates a database structure object 33 as shown in FIG. 5a and stores the metadata 48 or data extracted from the metadata therein (Step 65). The database structure object 33 is stored in a database transfer object 31, which is used by the server 14 to send data to the client 22 over HTTP/HTTPS. For ease of use and improved firewall penetration, the system uses the standard Web (HTTP/HTTPS) protocol and the client is a Java Applet that is automatically downloaded, installed and runs on a standard Web browser enabled with Java and is loaded using a standard URL. The database transfer object 31 is sent to the client 22 in step 66. Next in steps 68 and 69 the request processing application 32 retrieves from the structure for each table 50 and the data stored in each table. In step 70 the data retrieved from each table 50 is stored in a data object 35 corresponding to each table 50 that is generated by the data access application 34. Thus, for each table 50 in the source database 26 there is a corresponding data object 35 containing the data retrieved from the table 50. Each of these table objects is added to the database transfer object 31 in step 71.

Depending on the type of the source database 26, for each field or table 50 thereof, the metadata 48 includes sufficient information describing the structure and content of each table. The metadata 48 for each table 50 may include a table name 52, and information pertaining to the columns of the table such as column names 54 and the data type stored therein.

In the preferred embodiment, the data in each of the tables 50 of the source database 26 is retrieved by forming and executing appropriate JDBC queries. Typically, all data from the table 50 can be retrieved using a standard JDBC query such as: SELECT*FROM 'Table Name'. The execution of this query returns a Java Result Set object. Using the column information 54, retrieved from the data structure object 33, the data access application 34 generates queries to retrieve the data from each column of the table 50. The retrieved data is converted to Java objects as appropriate (e.g. string, byte array, date . . . ) and stored in a database data object 35 generated for and corresponding to the table 50.

When all tables 50 have been processed, and their database data objects 35 stored in a data transfer object 31, the data transfer object is sent to the client 22 via HTTP over the network 20 at step 72.

In one embodiment of the client-server system 10, prior to transferring a database transfer object 31 to the client 22, the size of the database transfer object 31 is compared to a maximum size which is a predetermined practical limit for the size of a single object to be serialized and transmitted over an HTTP channel. If the size of the database transfer object 31 is greater than the maximum, the database transfer object is truncated prior to the transfer thereof to the client 22.

Figure 7:
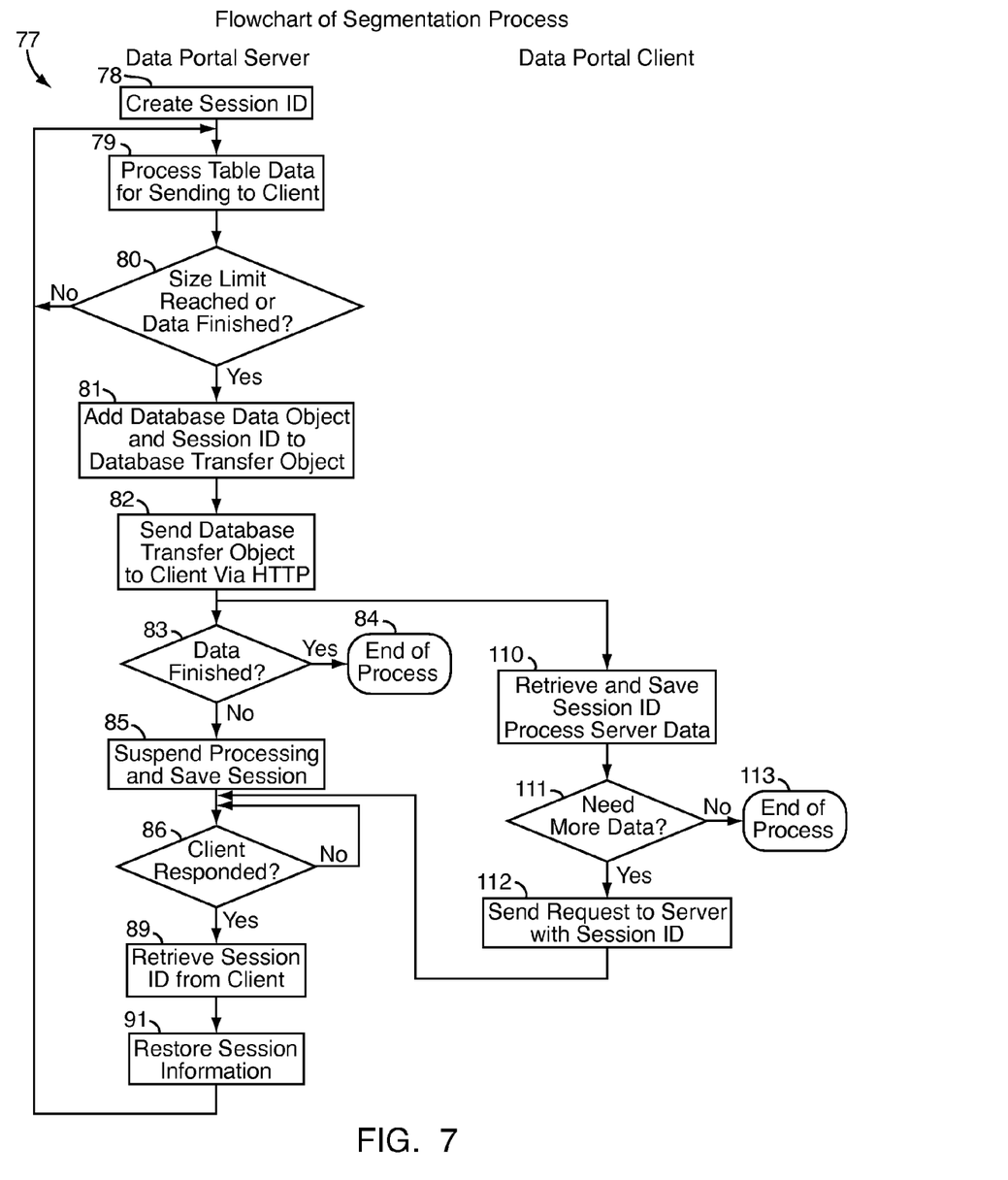
FIG. 7 is an exemplary flow chart of a segmentation process of a database object in accordance with the present invention.

FIG. 7 shows a flowchart of an exemplary embodiment of the segmentation process of the database transfer object 31 according to the present invention referred to generally by the reference numeral 77. The segmentation process starts at step 78 where a session identification value is assigned to the current transfer process so that it can be suspended, saved, retrieved and continued at any point in the process. Processing proceeds at step 79 as shown in detail in FIG. 6. At decision block 80 a determination is made to detect if either all data has been processed or the size of the database transfer object 31 to this point is greater than a predetermined maximum. This determination is made after determining and adding the size of each cell (element within a table row 50). If all data has been processed or the resulting size of the database transfer object 31 is greater than the maximum allowed size, the database transfer object 31, containing a database data object 35 and session information object 38, is transmitted to the client 22 at blocks 81 and 82. The client 22 retrieves the database transfer object 31 and extracts and saves the session information object 38 as indicated at step 110. The client 22 extracts the database data object 35 and processes it to create and populate a database 27 as detailed in FIG. 6. If no more data is required, as determined in block 111, the client process ends at block 113. Otherwise, the session information is used to form a request for more data and sent to the server 14 at step 112.

Once the latest database transfer object 31 has been sent to the client 22, if all data has been processed, server 14 processing ends at 84. If the decision at block 83 results in a determination that more data needs to be transferred, the current server processing thread is suspended and its parent object is saved in a hash table indexed with the session identification value. A request for more data is received from the client 22 at block 86. Upon receipt of a client request for additional data, the segmentation process retrieves the session identification value from the client request and uses it to retrieve the suspended processing thread (steps 89 and 91) which is then reactivated and processing continues as before at 79. This sequence is repeated as often as necessary until all data has been processed and sent to the client 22, at which point, the server 14 processing ends for the current database transfer.

Referring again to FIG. 6, at the client 22, the database transfer object 31 is received from the server 14 via the object transfer interface 42 as shown. At block 86, the JDBC driver required for the target database 27 is selected and loaded from the server 14. The server stores all JDBC database drivers that may be required by the client 22. At step 90, the data access interface 44 retrieves the name of the source database 26 from the database structure object 33 and generates and issues instructions to create a database 27 if the underlying database system allows this creation (step 92). A typical instruction to create such a database is: CREATE DATABASE databaseName. Some database servers do not allow the creation of a database in this fashion. In this case, a database 27 (which may or may not be empty) must be created and exist in the client system prior to the database transfer. The object transfer process 42 will delete all existing tables in the database 27 to prepare for new incoming ones.

At blocks 93 and 94, the client 22 receives the database data object 35 from the server 14. Next at decision block 96, the program determines whether or not all of the tables 50 have been processed by the data access interface 44 based on the database transfer object 31 received from the server 14. If not, a new table is generated corresponding to the next table 50 and stored in the database 27 (step 98). The new table is generated including the appropriate columns 54 based on information retrieved from the data structure object 33. At step 100, the new table is populated using the data from the data object 35. Once all of the tables 50 are processed, the transfer ends at block 102.

Following is a description on how the tables 50 are created, populated, and referenced in the database 27 according to one embodiment of the present invention. The client 22 processes all incoming tables 50 one at time. For each table 50, the program retrieves the column structure 54 (number of columns, column names, and data format for each column) from the metadata 48 which resides inside the database structure object 33. From this structure, a new table is created using a typical instruction such as:

CREATE TABLE "table_name"
(col_1_name    col_1_type(col_1_type_attribute) nullSetting,
col_2_name col_2type(col_2_type_attribute) nullSetting,
.
.
.
col_n_name col_n_type(col_n_type_attribute) nullSetting)

For string types, some binary types, and some numeric types, the type attribute specifies how many characters, bytes, or digits this column can hold for each entry. If the type attribute is not needed, the column type attribute and its surrounding parenthesis are absent. All column entries are assumed to be able to be set to null and nullSetting is normally left blank. If the column entry must have some value, the nullSetting is set to NOT NULL.

One at a time, the table 50 is then populated with data retrieved from the database data object 35. To speed up the data populating process, for each table 50, the data access interface 44 at the client issues data insertion instructions to the database server using a mechanism called a prepared statement. In this mechanism, a template for an insertion command is issued to the database server with a question mark in place of each of the columns of the table. The database server will compile this insertion command and awaits the incoming values for the columns of each row. A typical prepared statement is as follows:

INSERT INTO "tableName" (col_1_name, col_2_name, . . . , col_n_name)
VALUES (?, ?, . . . , ?)

The number of question marks in the template command above equals the number of columns. Once the prepared statement is issued, values corresponding to the columns are just filled in the proper order without the insertion command being re-issued or re-compiled. This fast insertion process continues until all rows 56 of the table 50 are processed and the table 50 is totally populated.

When all tables 50 have been created and populated, references between the tables are added to complete all data tables. The client data access interface 44 then proceeds to create the views. Views can be thought of as virtual tables, where all data are obtained from actual data tables. Views are how data across tables can be grouped together and presented in any desirable way to the user. The view bodies, which show how they are created, are retrieved from the database structure object 33. Once retrieved, the whole body can be issued to the database server and the views are created. Once created, users can examine all columns of views as if they are data tables. Since tables and views may be interdependent, the dependencies must be determined and tables and views must be created in the appropriate order so as not to conflict with dependency requirements.

Additionally the client-server system 10 of the present invention provides functionality for the incremental transfer of database data between the server 14 and the client 22 to maintain synchronization of a client database 27 with the source database 26. After an initial transfer (described above), resulting in the creation of a client database 27 that represents a copy of the source database 26, the server 14 can incrementally update the database 27 to reflect any changes applied to the source database 26 since the previous client database update. Alternatively, such an incremental update can be initiated by the client 22 to retrieve any changes to the source database 26 since the previous transfer (complete or incremental).

In one embodiment of the client-server system 10, an incremental transfer process is implemented by maintaining a column in each table 50 where the latest modification time for each row 56 is stored as a timestamp. The latest timestamp for a client database transfer is also maintained. All data modified since the last client database transfer can be retrieved using a SQL query utilizing the timestamp columns and sent to the client to perform an incremental update, resulting in a re-synchronization of the client database 27 with the source database 26.

Additionally, the client-server system 10 provides a Web based general database utility for viewing and modifying database data across database types, vendors and platforms. The server 14 provides a Web based user interface (not shown) wherein a user can identify a selected source database 26 and/or request a search within the identified source database 26. The server 14 converts the client request internally to a standard DataPortal (client-server system 10) form as described above for accessing the source database 26 and retrieving the requested data therefrom. The retrieved data is converted to serial object form including data structure objects 33 and database data objects 35 as necessary and transmitted to the client 22 as described above. The client upon receipt of the data objects (33, 35) extracts the data therefrom using the above described methods and displays the appropriate columns, rows, tables, database, etc. as necessary for client viewing and modification of the requested data.

All data modified or updated by a client user is then returned to the server 14 wherein the server generates the appropriate SQL statements including the modified data and updates the source database 26 accordingly.

The client-server system 10 ensures a high level of data integrity throughout the process of transferring data over the network 20 between a server 14 and client 22 as follows. The transferred data is broken down into a hierarchy of objects as described above, each of which is serialized and sent over the network 20 using strict network protocols, including HTTP. When objects are received by the client 22, the parent class of each object is verified, and the objects are instantiated and populated. Each of these steps imposes additional data integrity checks upon the transferred data. Only after each of the transferred objects have been recreated on the client 22, the processing proceeds. Accordingly, the transfer process requires that all objects conform to strict templates and any deviation from expectations will cause an error that will be reported to the server 14. Much of this data integrity enforcement is inherent in the Java language. Java constantly checks for data integrity at many levels and reports any detected problems programmatically through its exception handling mechanism. If Java reports any material exceptions to the system, the entire database transfer is terminated and, the database transfer in progress is removed and the process is restarted from the beginning.

In addition to the inherent integrity enforcement imposed by Java as described above, the client-server system 10 provides a further data verification process that utilizes row checksums. As the database structure objects 33 and database data objects 35 containing database data and structure are being built by the server 14, the size of the data for each database data object 35 is calculated, in part, to limit the size of objects that are serialized and transferred to the client, as described above in the segmentation process illustrated in FIG. 7. Additionally, if the data verification process is implemented, the row size in data bytes of each row of the tables 50 that are sent to the client 22 is calculated and sent along with the table data to the client. As the client recovers the data and uses it to build and populate database tables, it tracks the size in data bytes of each row it adds to the database. This size is compared to the size calculated and transferred by the server 14. Any discrepancies in row size for each table 50 will be detected and treated as a material exception, resulting in an error and the termination of the current database transfer. The database 26 in progress is removed and the transfer process is restarted again from the beginning.

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A client-server system for transferring a database from a server to a client over the Web, the system comprising:

a server connectable to the Web including a Web server;

a source database of a first database type accessible to the server having metadata and database data stored therein, the server associating a structure object with the metadata and a data object with the database data;

a client automatically downloaded from the server and automatically installed in a Web browser connectable to the Web for communication with the Web server, the client connectable to a database for storing a copy of the source database in a target database of a second database type;

a graphical user interface operable at the client for causing the generation and population of the target database, initiation of a database transfer via the graphical user interface requiring only identifying the source database, identifying the target database, and use of a selector to initiate the database transfer;

the server having a programming interface including an interface corresponding to each of a plurality of known databases stored thereon, the server programmed to automatically identify and load the interface corresponding to the source database for accessing the source database and retrieving the metadata and at least a portion of the database data and storing the retrieved metadata in the structure object and the database data in the data object;

the server sending the structure object and the data object to the client over the Web via a Web protocol over standard Web channels such that firewall modification is not required at the client;

the client including a processor for automatically downloading and installing an interface corresponding to the target database, receiving the structure object and the object from the server, creating the target database using the metadata, and populating the target database with the database data retrieved from the data object including mapping data types from the source database of the first type to that of the target database of the second type; and wherein the client-server system provides for the transfer of the source database of the first database type to the client and target database of the second database type across various database types, vendors and operating systems without user interaction following initiation of the transfer via the graphical user interface, the system being automated such that no programming or scripting is required for initiating or carrying out the transfer and the user is not required to have any knowledge of the source database apart from a name thereof.

2. The client-server system according to claim 1 wherein the programming interface includes a data access application having an executable program for generating and executing queries to the source database to extract database structure information from the metadata and store the database structure information in the structure object, the database structure information including at least one of:

a database identifier for the source database;

a list of tables stored in the source database;

a list of columns for each table; and a data type for each column.

3. The client-server system according to claim 1 wherein the structure object and the data object are serialized prior to being transmitted to the client.

4. The client-server system according to claim 1 wherein the source database of the first database type and the target database of the second database type are both of the same database type.

5. The client-server system according to claim 4 further comprising a database server coupled to the database.

6. The client-server system according to claim 2 wherein the programming interface is a Java DataBase Connectivity (JDBC) component.

7. The client-server system according to claim 5 wherein the database server further comprises a Relational DataBase Management System (RDBMS).

8. The client-server system according to claim 1 wherein the client further comprises a Relational DataBase Management System (RDBMS).

9. The client-server system according to claim 1 wherein the client includes a Java applet downloadable from the server and automatically installed on the client.

10. The client-server system according to claim 1 wherein the database to be copied is identified in a request from the client using a Uniform Resource Locator (URL).

11. The client-server system according to claim 1 wherein the target database is populated in an order corresponding to any table dependencies.

12. The client-server system according to claim 1 wherein the server further comprises a request processing application for validating client access to a requested database or portion thereof.

13. The client-server system for transferring a database from a server to a client over the Web according to claim 1 wherein the data object is transferred via a Web protocol for ensuring data encryption over the network and firewall penetration at the client.

14. The client-server system according to claim 1 further comprising an incremental transfer process for maintaining synchronization between the source database and the target database.

15. The client-server system according to claim 1 further comprising a Web based utility for client viewing and modifying the database data in a source database, the utility operable across database types, vendors and operating systems.

16. The client-server system according to claim 1 further comprising a data verification application for verifying the integrity of the data objects transferred to the client over the network.

17. A client-server system for transferring a database from a server to a client over the Web, the system comprising:
a server connectable to the Web including a Web server;
a source database of a first database type accessible to the server having metadata and database data stored therein, the server associating a structure object with the metadata and a data object with the database data;
a client automatically downloadable from the server and installable in a Web browser connectable to the Web for communication with the Web server, the client connectable to a database system for storing a copy of the source database in a target database of a second database type;
the client configured for receiving a programmatically generated HTTP transfer request for transferring the source database from the server to the client, the client automatically initiating said transfer upon receipt of the transfer request;
the server having a programming interface including an interface corresponding to each of a plurality of known databases stored thereon, the server programmed to automatically identify and load the interface corresponding to the source database for accessing the source database and retrieving the metadata and at least a portion of the database data and storing the retrieved metadata in the structure object and the database data in the data object;
the server sending the structure object and the data object to the client over the Web via a Web protocol over standard Web channels such that firewall modification is not required at the client;
the client including a processor for automatically downloading and installing an interface corresponding to the target database, receiving the structure object and the data object from the server, creating the target database using the metadata, and populating the target database with the database data; and wherein the client-server system provides for the transfer of the source database of the first database type to the client and target database of the second database type across various database types, vendors, and operating systems.

18. The data access application according to claim 17 further comprising a Java DataBase Connectivity (JDBC) interface for accessing the database and retrieving therefrom the metadata and at least a portion of the data stored therein.

19. A method for transferring a database from a server to a client over the Web the method comprising the steps of:
at a server connected to the Web and including a Web server:
storing a programming interface corresponding to each of a plurality of known databases on the server;
providing a source database of a first database type having metadata and database data stored therein;
causing the display of a graphical user interface at the client, the graphical user interface operable for causing the generation and population of a target database of a second database type upon initiation of a database transfer via the graphical user interface, the target database for storing a copy of the source database at the client;
receiving a request for transferring the source database from the server to the client;
loading the programming interface corresponding to the source database;
accessing the source database and retrieving the metadata and at least a portion of the database data stored therein;
storing the database data in at least one data object;
sending the metadata and the at least one data object to a client over the Web via a Web protocol over standard Web channels such that data encryption over the network and firewall modification at the client is not required;
the server operating on the source database across various database types, vendors and operating systems without user interaction following initiation of the transfer via the graphical user interface;
at a client:
automatically downloading and installing a programming interface corresponding to the target database;
receiving the metadata and the at least one data object;
generating the target database according to the metadata;
populating the target database with the database data; and wherein
the method including transferring the source database from the server to the client without user interaction following initiating the transfer via the graphical user interface, the method requiring no manual software installation of the client and no programming or scripting for initiating or carrying out the transferring of the source database from the server to the client.

20. The method of claim 19 further comprising:
at the server:
storing the metadata in a structure object;
storing the structure object and the at least one data object in a database object;
serializing the database object; and
transferring the database object to the client.

21. The method of claim 19 further comprising:
at the server:
comparing a size of the database object to a maximum size prior to the transfer thereof to the client; and
if the size of the database object is greater than a maximum size, segmenting the database object and separately transferring each of the segments to the client.

22. The method of claim 21 further comprising:
at the server:
generating an auxiliary object for storing the segments of the database object exceeding the maximum size prior to the transfer thereof to the client.

23. The method of claim 19 further comprising:
at the server:
querying the source database for retrieving the metadata and the database data stored therein.

24. The method of claim 19 further comprising:
at the server:
validating a client for authorization to access the source database or a portion thereof prior to accessing the source database.

25. The method of claim 19 further comprising:
maintaining synchronization between the source database and the target database residing on the client.

26. The method of claim 19 further comprising:
providing a Web based utility for client viewing and modifying the source database.

27. The client-server system for transferring a database from a server to a client over the Web according to claim 1 wherein the data object is encrypted via a secure Web protocol prior to transmission thereof to the client.

28. The client-server system for transferring a database from a server to a client over the Web according to claim 1 wherein the graphical user interface includes a pull-down menu for identifying the source database, the pull-down menu displaying an identifier for each of a plurality of databases available at the server for transfer to the client.

29. The client-server system for transferring a database from a server to a client over the Web according to claim 1 wherein the system is configured as a stand-alone product operable for completing the transfer process without the use of additional applications.

30. The client-server system for transferring a database from a server to a client over the Web according to claim 1 wherein the transfer process requires only minimal effort on the part of a user for initiating the transfer and no action thereafter.

31. The client-server system for transferring a database from a server to a client over the Web according to claim 1 wherein the user can initiate a database transfer without any knowledge or skill related to the databases or database programming.

32. The client-server system for transferring a database from a server to a client over the Web according to claim 1 wherein the structure object and the data object are segmented as required prior to transmitting the same to the client for limiting the size of the individual transmissions.

* * * * *